United States Patent
Stoegmueller

Patent Number: 6,018,669
Date of Patent: Jan. 25, 2000

[54] CARD READING MEANS FOR MOBILE RADIO DEVICES

[75] Inventor: Rupert Stoegmueller, Munich, Germany

[73] Assignee: Siemens Aktiengesellschaft, Munich, Germany

[21] Appl. No.: 09/218,217

[22] Filed: Dec. 22, 1998

[30] Foreign Application Priority Data

Dec. 22, 1997 [DE] Germany .......................... 197 57 371

[51] Int. Cl.[7] .................................................. H04B 1/38
[52] U.S. Cl. .......................... 455/558; 379/357; 379/433; 455/575; 455/90; 455/347; 455/351; 235/441
[58] Field of Search .................................... 455/558, 557, 455/556, 550, 572, 100, 575, 347, 90, 351, FOR 121; 235/439, 441, 492; 361/737; 379/357, 433

[56] References Cited

U.S. PATENT DOCUMENTS

| | | | |
|---|---|---|---|
| 5,109,540 | 4/1992 | Dzung et al. | 455/90 |
| 5,257,414 | 10/1993 | Trahan et al. | 455/90 |
| 5,436,969 | 7/1995 | Kobayashi | 379/433 |
| 5,615,250 | 3/1997 | Kobayashi | 455/90 |
| 5,669,069 | 9/1997 | Rautila | 455/558 |
| 5,826,176 | 10/1998 | Choi | 455/90 |
| 5,831,256 | 11/1998 | De Larminat et al. | 235/439 |
| 5,894,597 | 4/1999 | Schwartz et al. | 455/558 |

FOREIGN PATENT DOCUMENTS

| | | | |
|---|---|---|---|
| 0 276 403 A2 | 8/1988 | European Pat. Off. | H04B 1/38 |
| 0 522 762 A2 | 1/1993 | European Pat. Off. | H04M 1/72 |
| 0 556 970 A1 | 8/1993 | European Pat. Off. | H04B 1/38 |
| 690 22 653 T2 | 1/1991 | Germany | H04B 1/08 |
| 41 38 342 C2 | 5/1992 | Germany | H04M 1/02 |
| 93 08 399 U1 | 12/1993 | Germany | H04M 1/02 |

*Primary Examiner*—Wellington Chin
*Assistant Examiner*—Rafael Perez-Gutierrez
*Attorney, Agent, or Firm*—Hill & Simpson

[57] ABSTRACT

The card reading device is for use in mobile radio devices. From a battery compartment, the card is longitudinally inserted into a receiving apparatus through a receiving slot and is ejected through the receiving slot, following use, by a slide which is accessible from outside through an opening in the housing and which has a catch for the card. For reasons of space efficiency the slide is located beneath the receiving apparatus, the catch being arranged at the end of the slide, which is situated behind the card, viewed in the direction of card ejection. The front edge of the slide, viewed in the direction of card ejection, serves as a snapping lock for the battery and projects into the battery compartment through a second slot. In a first inserted position of the slide the front edge projects a prescribed length into the battery compartment. The slide can be slid counter to a spring restoring force into a second position, in which the front edge is located inside the second slot.

10 Claims, 3 Drawing Sheets

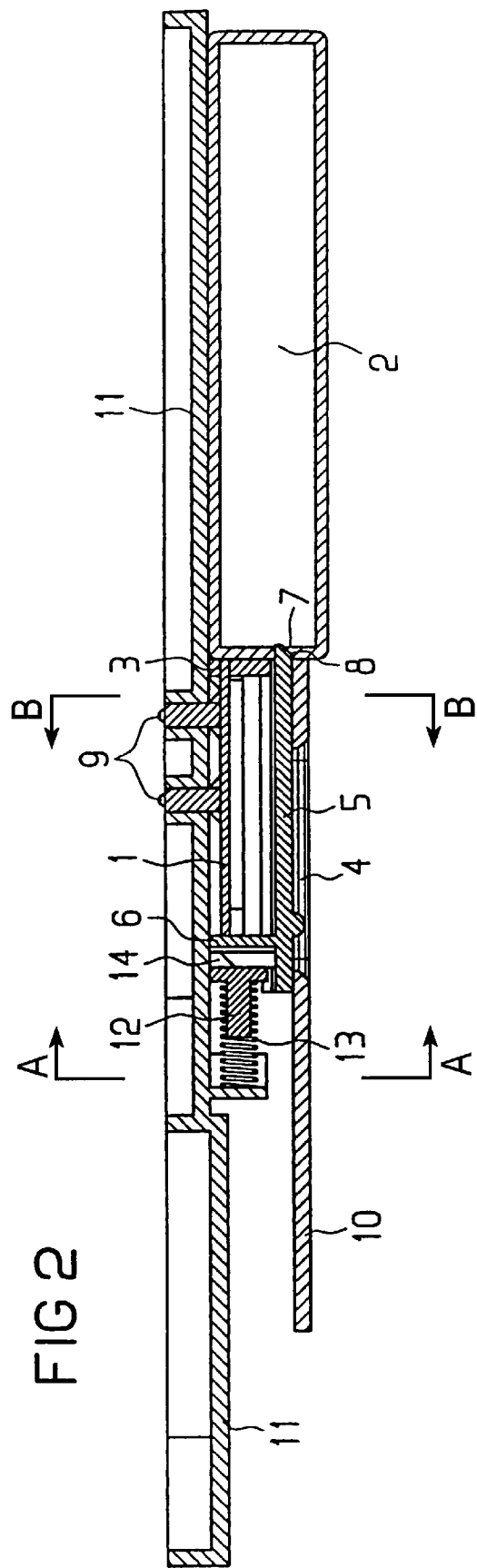

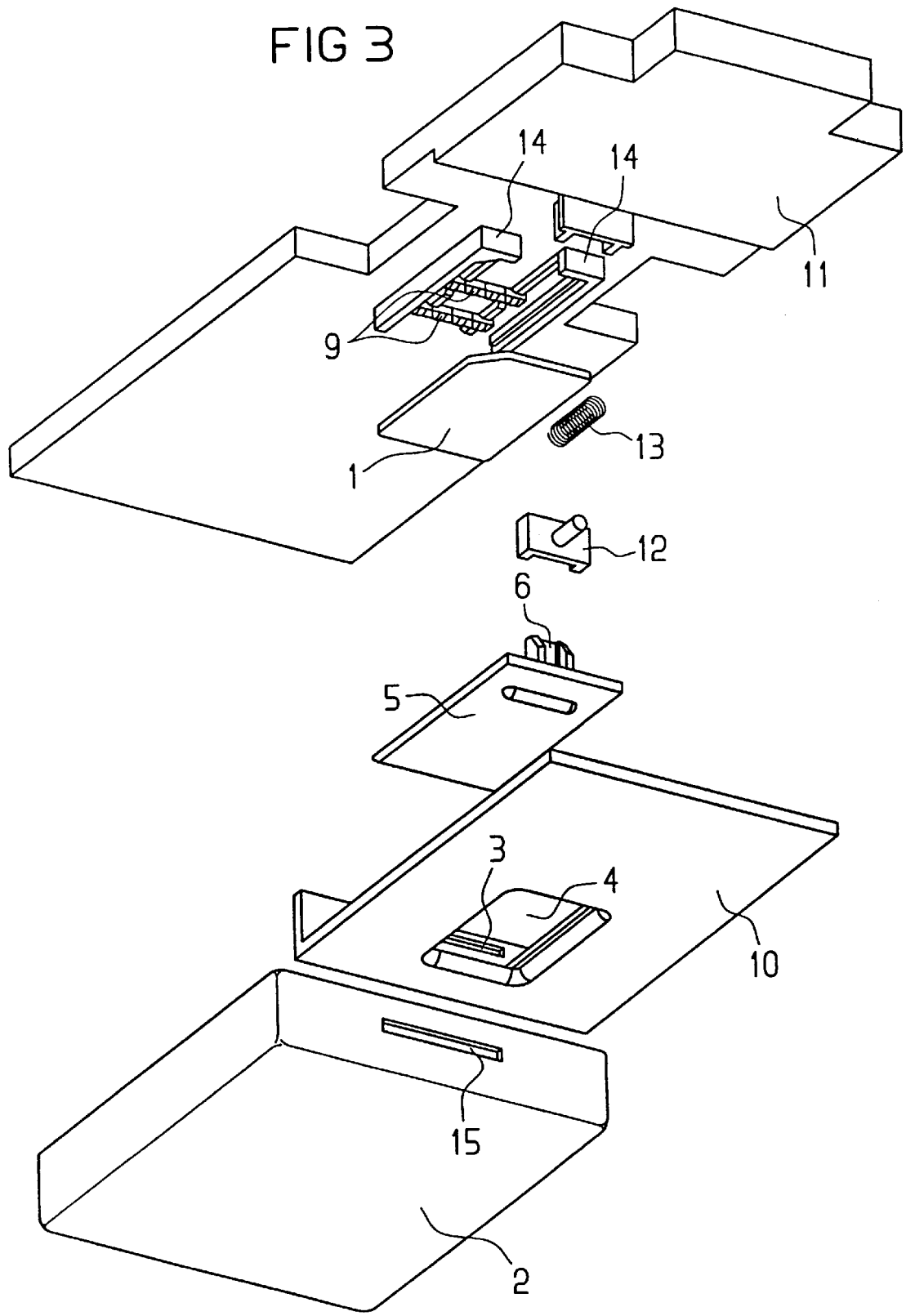

CARD READING MEANS FOR MOBILE RADIO DEVICES

BACKGROUND OF THE INVENTION

The present invention relates to a card reading means for mobile radio devices. From a battery compartment, the card is longitudinally inserted into a receiving apparatus through a receiving slot and is ejected through the receiving slot, following use, by means of a slide. The slide is accessible from outside through an opening in the housing and which comprises a catch for the card.

Card readers of this type are known in the prior art. The slides can be laterally arranged or are arranged on a back side, whereby the slide is located behind the card in the longitudinal direction of the mobile radio device, viewed in the direction of the ejection of the card. Since in all cases the slide is located in the immediate vicinity of the battery compartment, where a locking apparatus for the battery is also accommodated, considerable space problems arise, which represents an obstacle to further downsizing of the mobile radio device.

SUMMARY OF THE INVENTION

It is an object of the present invention to provide a card reader of the abovementioned type which enables a locking of the battery without a large space requirement.

For a card reader of this type this object is achieved in that the slide is located beneath the receiving apparatus for the card. The catch for the card being arranged at the end of the slide, which is situated behind the card, viewed in the direction of card ejection. The front edge of the slide, viewed in the direction of card ejection, serves as a snapping lock for the battery and projects into the battery compartment through a further slot. In a first inserted position of the slide the front edge projects a predetermined distance into the battery compartment. The slide can be pushed counter to the restoring force of the spring into a second inserted position in which the front edge is located inside the second slot.

In the inventive card reading apparatus the battery locking device is integrated into the card reading apparatus, which leads to a lower space requirement for the card reading apparatus and the battery locking device.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 is a longitudinal section through the housing section depicted in FIG. 1;

FIG. 3 is a perspective exploded view of the housing section depicted in FIG. 1;

DESCRIPTION OF THE PREFERRED EMBODIMENTS

Figure 1:
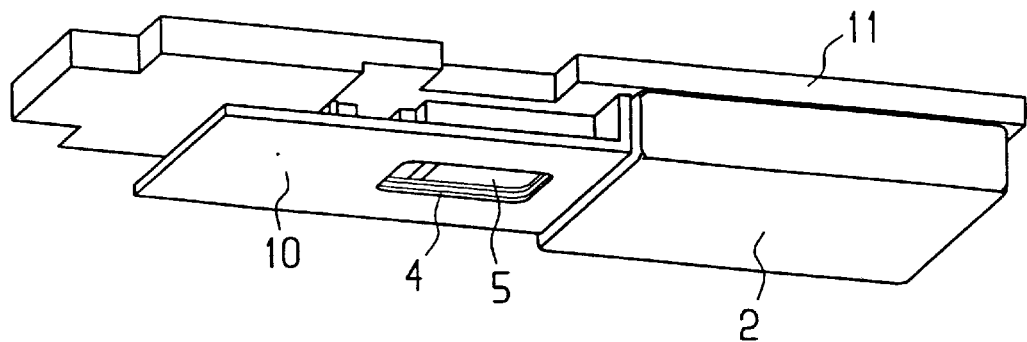
FIG. 1 is a perspective view of a housing section of a mobile radio device containing an inventive card reading means and of a battery.
Figure 4:
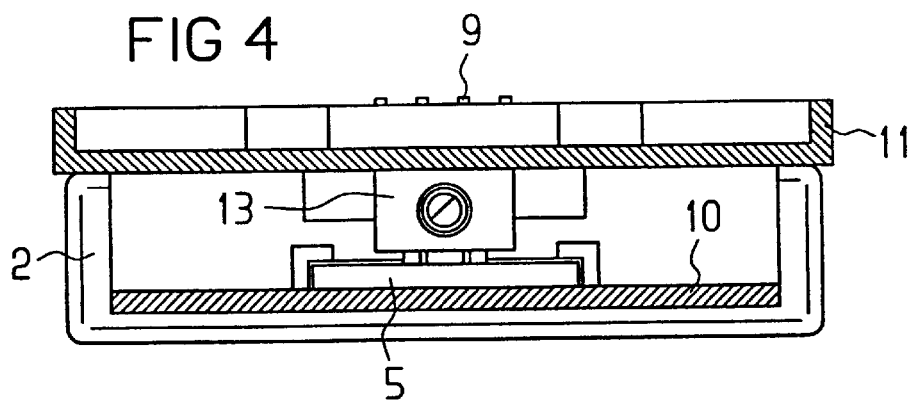
FIG. 4 is a cross-section through the housing section depicted in FIG. 1 along the line A—A depicted in FIG. 2.
Figure 5:
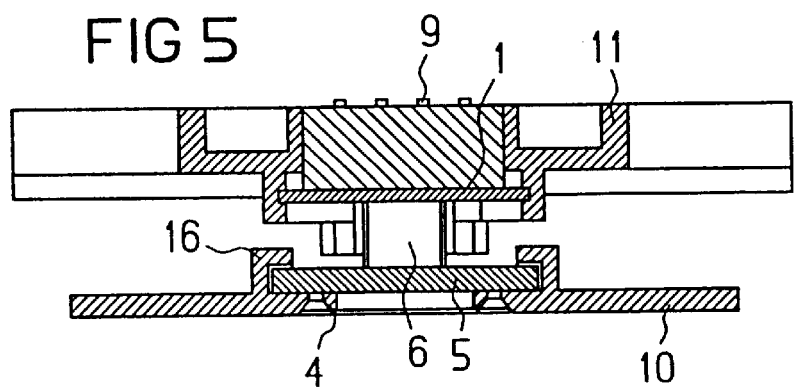
FIG. 5 is a cross-section through the housing section depicted in FIG. 1 along the line B—B depicted in FIG. 2.

Only the components which are essential for understanding the present invention are depicted in FIGS. 1–5, that is, only the housing section of the mobile radio device containing the card reading means for the card 1 (an SIM card in the illustrated example) and the battery 2 are depicted.

In the vicinity of the bottom of the battery compartment the card reading means has a receiving slot 3 through which the card 1 is manually inserted into the card reading means. It is read in the card reading means by means of the contact bank 9, which is secured at the screening housing 11. When the card 1 is no longer needed it is ejected using a slide 5 which is accessible through a housing opening 4 in the device housing 11. With the sliding of the slide 5 in the eject direction the card 1 is thus caught by the catch 6 and ejected through the receiving slot 3. The slide 5 is subsequently slid back and the old card can be removed from the battery compartment. A new card can then be inserted.

Viewed in the direction of card ejection, the front edge of the slide in the inventive card reading means, which projects into the battery compartment through the second slot 8, is utilized as a battery locking device, engaging in a corresponding rear opening 15 provided in the battery 2 for the locking of the battery 2.

In a first inserted position of the slide 5 the front edge of the slide projects a prescribed length into the battery compartment. This position is first reached following the insertion of a card 1 or following a normal insertion of the slide 5 through the housing opening 4 up to a first stop point, for example.

In this first position the catch 6 of the slide 5 contacts a element 12. In its resting state the readjusting element 12 lies adjacent to stops 14 arranged laterally with respect to the catch 6. The readjusting element 12 is pressed against these stops 14 by means of a readjusting spring 13.

With the insertion of a battery 2 into the battery compartment the slide 5 is pushed further by the battery 2 with its front edge, counter to the springing force of the readjusting spring 13, into a second position in which the front edge no longer projects into the battery compartment. This second position can also be reached by actuation of the slide 5 by hand through the housing opening 4.

When the battery 2 has reached its final position, that is, when the front edge of the slide 5, which serves as the battery locking element, is situated opposite the rear opening 15 provided in the battery 2 for the lock, then the front edge of the slide 5 is pushed into the rear opening 15 by the restoring force of the readjusting spring 13, and the battery 2 is locked.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A card reading device for mobile radio devices, comprising:

from a battery compartment, the card is longitudinally insertable into a receiving apparatus through a receiving slot and is ejectable through the receiving slot, following use, by a slide which is accessible through a housing opening and which has a catch for the card;

the slide being located beneath the receiving apparatus for the card;

the catch for the card being arranged at an end of the slide, which is situated behind the card, viewed in a direction of card ejection; and a front edge of the slide, viewed in the direction of card ejection, being a snapping lock for the battery and projecting into the battery compartment through a second slot;

wherein in a first inserted position of the slide the front edge projects a predetermined distance into the battery compartment; and wherein the slide is slidable counter to a spring restoring force into a second position in which the front edge is located inside the second slot.

2. The card reading device according to claim 1, wherein, in the sliding of the slide into the second position, the catch is pushed through between two stops and against a readjusting element, the readjusting element being pressed against the stops by a readjusting spring.

3. The card reading device according to claim 1, wherein the front edge of the slide is beveled.

4. The card reading device according to claim 1, wherein the slide is led in a guide securely connected to the device housing.

5. A card reading device for mobile radio devices, comprising:

from a battery compartment, the card is longitudinally insertable into a receiving apparatus through a receiving slot and is ejectable through the receiving slot, following use, by a slide which is accessible through a housing opening and which has a catch for the card;

the slide being located beneath the receiving apparatus for the card;

the catch for the card being arranged at an end of the slide, which is situated behind the card, viewed in a direction of card ejection; and a front edge of the slide, viewed in the direction of card ejection, being a snapping lock for the battery and projecting into the battery compartment through a second slot;

wherein in a first inserted position of the slide the front edge projects a predetermined distance into the battery compartment; and wherein the slide is slidable counter to a spring restoring force into a second position in which the front edge is located inside the second slot such that the catch is pushed through between two stops and against a readjusting element, the readjusting element being pressed against the stops by a readjusting spring.

6. The card reading device according to claim 5, wherein the front edge of the slide is beveled.

7. The card reading device according to claim 5, wherein the slide is led in a guide securely connected to the device housing.

8. A card reading device for mobile radio devices, comprising:

from a battery compartment, the card is longitudinally insertable into a receiving apparatus through a receiving slot and is ejectable through the receiving slot, following use, by a slide which is accessible through a housing opening and which has a catch for the card;

the slide being located beneath the receiving apparatus for the card;

the catch for the card being arranged at an end of the slide, which is situated behind the card, viewed in a direction of card ejection;

a front edge of the slide, viewed in the direction of card ejection, being a snapping lock for the battery and projecting into the battery compartment through a second slot;

wherein in a first inserted position of the slide the front edge projects a predetermined distance into the battery compartment;

wherein the slide is slidable and led in a guide securely connected to the device housing and moves counter to a spring restoring force into a second position in which the front edge is located inside the second slot.

9. The card reading device according to claim 8, wherein, in the sliding of the slide into the second position, the catch is pushed through between two stops and against a readjusting element, the readjusting element being pressed against the stops by a readjusting spring.

10. The card reading device according to claim 8, wherein the front edge of the slide is beveled.

* * * * *